United States Patent [19]

Scott

[11] E Re. 29,830

[45] Reissued Nov. 14, 1978

[54] CEMENTING PLUG LAUNCHING APPARATUS

[75] Inventor: Lyle B. Scott, South Gate, Calif.

[73] Assignee: BJ-Hughes Inc., Long Beach, Calif.

[21] Appl. No.: 542,491

[22] Filed: Jan. 20, 1975

Related U.S. Patent Documents

Reissue of:

[64] Patent No.: 3,545,542
Issued: Dec. 8, 1970
Appl. No.: 735,685
Filed: Jun. 10, 1968

[51] Int. Cl.[2] ..... E21B 33/12; E21B 33/16

[52] U.S. Cl. ..... 166/155; 166/156

[58] Field of Search ..... 166/0.5, 70, 155, 156, 166/291, 144

[56] References Cited

U.S. PATENT DOCUMENTS

| | | | |
|---|---|---|---|
| 2,104,270 | 1/1938 | Owsley | 166/70 |
| 2,164,190 | 6/1939 | Klomp | 166/156 |
| 2,738,011 | 3/1956 | Mabry | 166/144 |
| 3,350,130 | 10/1967 | Ahlstone et al. | 166/0.5 |
| 3,364,996 | 1/1968 | Brown | 166/156 |
| 3,368,618 | 2/1968 | Knox | 166/0.5 |
| 3,414,056 | 12/1968 | Brown et al. | 166/0.5 |

*Primary Examiner*—Ernest R. Purser

*Attorney, Agent, or Firm*—J. B. McGuire

[57] ABSTRACT

Cementing plug launching apparatus for use in cementing a casing string in a well in which a casing closure is releasably attached to the upper end of the casing string, the closure having a cement conduit opening therethrough and in which a cementing plug is releasably supported below the closure by the cement conduit, the plug being separable from the cement conduit upon introduction of a ball into the cement flowing into the casing through the conduit. Such apparatus in which a combination of top and bottom plugs are releasably supported by the cement conduit, the bottom plug being releasable from the top plug in response to the introduction of a first ball into the cement flowing through the cement conduit into the casing and the top plug being released from the cement conduit in response to the introduction of a second ball into the cement flowing through the cement conduit into the well casing, a float shoe being provided at the lower end of the casing for arresting downward movement of the bottom and top plugs, respectively. Such apparatus in which the casing closure includes releasable latch means for latching the same to a well head structure at the bottom of a body of water. Such apparatus in which the casing closure comprises an adaptor threadedly engageable in a casing coupling.

8 Claims, 11 Drawing Figures

INVENTOR
LYLE B. SCOTT
BY C. G. Stallings
ATTORNEY

INVENTOR
LYLE B. SCOTT
BY C. H. Stallings
ATTORNEY

INVENTOR
LYLE B. SCOTT
BY C. G. Stallings
ATTORNEY

INVENTOR
LYLE B. SCOTT
BY C. G. Staelinga
ATTORNEY

INVENTOR
LYLE B. SCOTT

BY L. G. Stellinger
ATTORNEY

INVENTOR
LYLE B. SCOTT
BY C. G. Stallings
ATTORNEY

INVENTOR
LYLE B. SCOTT
BY C. G. Stallings
ATTORNEY

CEMENTING PLUG LAUNCHING APPARATUS

Matter enclosed in heavy brackets [ ] appears in the original patent but forms no part of this reissue specification; matter printed in italics indicates the additions made by reissue.

BACKGROUND OF THE INVENTION

In the cementing of well casings in well bores, it is the practice to employ one or more so-called cementing plugs to provide a barrier between the fluid within the well casing and a quantity of cement which is displaced into the casing, as well as to form a barrier between the cement and a following fluid employed to force the cement downwardly through the casing and thence upwardly through the annular space defined between the casing the well bore on the one hand, or, on the other hand, in the case of multiple strings of casing, in the annular space defined between the string of casing being cemented within the well bore and a previously set string of casing.

Customarily, the cementing of casing strings in well bores moreover has involved the use of so-called cementing heads which are devices adapted to be connected to the upper end of the casing string and providing a support for releasably holding the cementing plugs in the cementing head until it is desired that the plugs be released ahead of and behind the cement slurry as it is displaced through the cementing head into the well casing.

Such cementing heads are expensive to manufacture and maintain and, moreover, are subject to failure following repeated uses. Accordingly, the cost of the usual cementing head equipment is a significant factor in the total cost of a well cementing operation. Furthermore, in the use of cementing heads in the cementing of wells drilled from a platform on a body of water where the wellhead equipment, for the purpose of drilling, completing and producing the well, is all located at the bottom of the water, the cementing head may be so constructed that it constitutes a structural element which, during the running of the casing string into the well bore, must support the weight of the casing string. The weight of a string of casing may be substantial, in view of the fact that the casing may be of various diameters and wall thicknesses and may extend thousands of feet into the earth.

SUMMARY OF THE INVENTION

The present invention provides cement plug launching apparatus which eliminates the use of conventional cementing heads.

The present invention provides cement plug launching apparatus which is, compared with the usual cementing heads, very simple in construction and which substantially eliminates the failure problems heretofore encountered in the use of conventional cementing heads resulting from the application of high pressure pulses over prolonged periods of times to the prior cementing head constructions.

The present invention also provides cementing plug launching apparatus wherein, in the cementing of a string of well casing in an offshore well in which the wellhead equipment is at the bottom of the water, the launching apparatus is structurally separated from the casing supporting apparatus during running of the casing so that the launching apparatus is not subjected to the weight of the casing string.

More specifically, in accomplishing the foregoing the present invention provides plug launching apparatus wherein a top cementing plug is releasably connected to a tubular member forming part of a conduit, fluid passing through the conduit during the usual circulation and cement displacement operations, and the top plug having a fluid passage therethrough to allow the circulation of fluid downwardly through the plug while the latter is attached to the tubular member, but the top plug having a seat circumscribing the passage through the plug and adapted to be engaged by a closure device placed in the fluid stream following the desired displacement of cement through the top plug, so as to effect release of the top plug from the tubular member, the top plug thereupon forming a barrier at the top of the cement previously displaced therethrough. In another embodiment of the invention, a bottom plug is combined with the top plug by releasable connector means, this bottom plug also having a fluid passage therethrough to enable the circulation of fluid through the bottom plug, this bottom plug having a seat circumscribing the fluid passage and adapted to be closed by a closure device placed in the fluid stream so as to effect release of the bottom plug from the top plug so that the bottom plug effectively constitutes a barrier between the cement and the circulating fluid moving downwardly in the wall casing in advance of the bottom plug.

Among the objects of the invention is the provision of plug launching apparatus for use in well cementing operations, the apparatus being significantly less expensive than the usual cementing head apparatus and, moreover, being durable and easy to employ in lieu of the usual cementing head apparatus.

Other objects and advantages of the invention will be hereinafter described or will become apparent to those skilled in the art, and the novel features of the invention will be defined in the appended claims.

DESCRIPTION OF THE PREFERRED EMBODIMENTS

Figure 1:
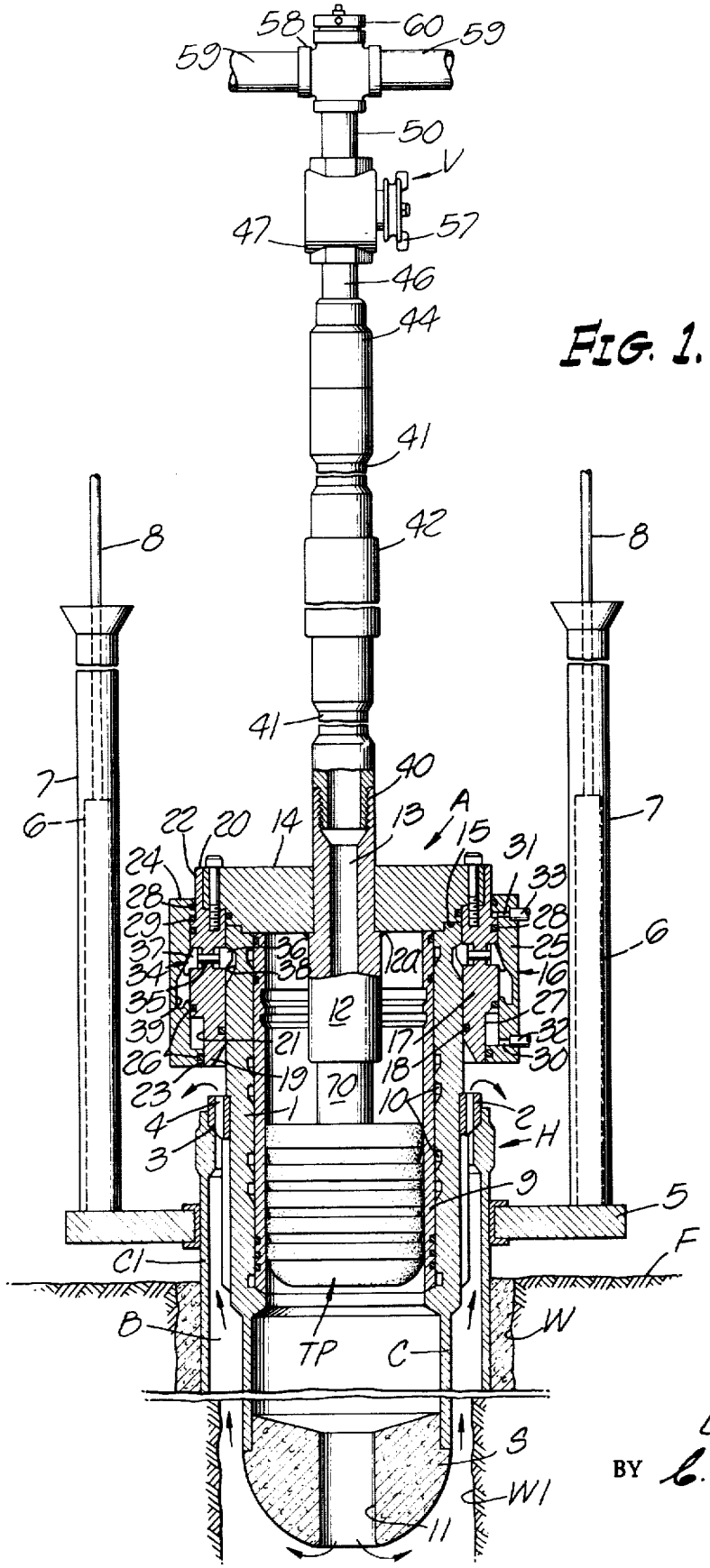
FIG. 1 is a view partly in elevation and partly in vertical section illustrating plug launching apparatus made in accordance with the invention installed in association with underwater well head equipment apparatus.
Figure 2A:
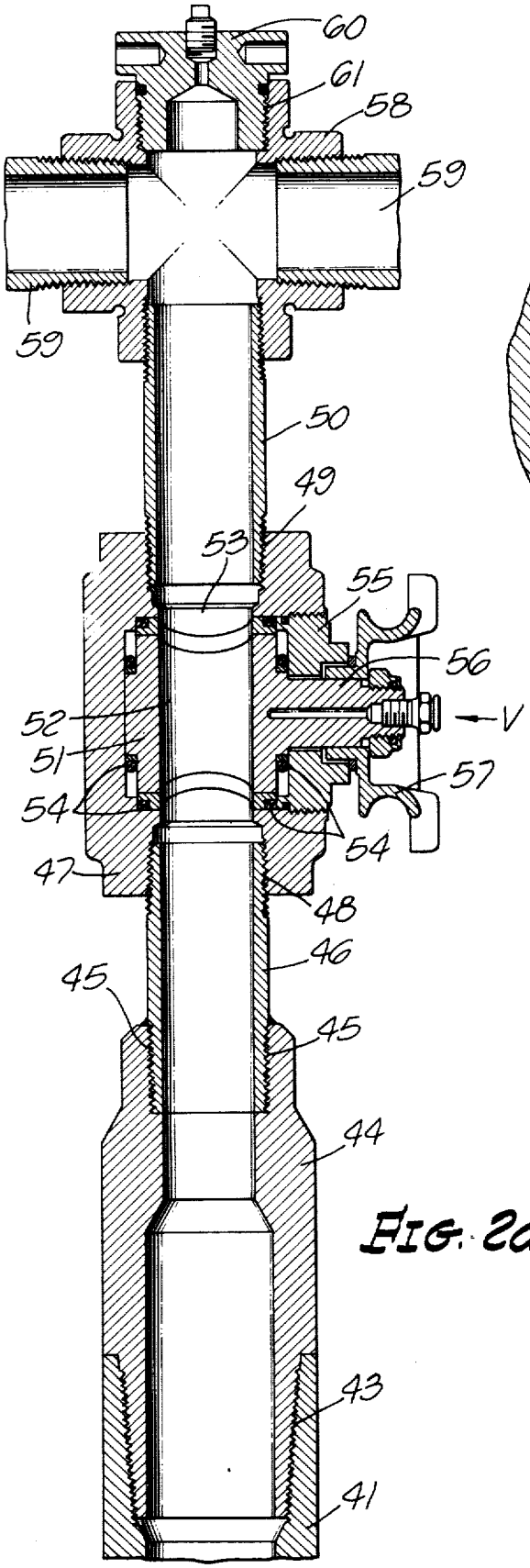
FIG. 2a is a view in vertical section illustrating on an enlarged scale the upper portion of the apparatus of FIG. 1.

Referring first to FIGS. 1 through 4, there is illustrated plug launching apparatus generally denoted A including a cementing plug, which is herein characterized as a top cementing plug designated TP, disposed within wellhead equipment generally denoted at H. Depending downwardly from the wellhead H is a string of well casing C which is to be cemented in place within an annular space B defined between the casing C and an outer string of surface casing C1 which has been previously set in the well bore W and cemented in place. The lower end of the casing string C extends further downwardly beyond the lower extremity of the casing C1 into a reduced well bore section W1. At the lower end of the casing string C is the usual cementing shoe S.

The casing string C is supported in the wellhead apparatus H by a tubular well head body 1 which is seated upon an annular support 2 which, in turn, is seated in an annular seat 3 provided at the upper end of the outer string of casing C1. The annular support 2 has a suitable number of flow passages 4 extending therethrough to establish communication between the annular space B below the support 2 and the water above the support 2.

The wellhead equipment H is merely illustrative of such equipment as is in use in the supporting of casing in well bores drilled into the earth from a platform at the surface of a body of water, the well head H being supported by a base support 5 which is integrated with the first or outermost casing string C1 adjacent the floor or bottom F of the body of water. Typically, such support structure 5 has a number of upstanding posts 6 which slidably receive and guide tubular elements 7 formed as part of apparatus adapted to be raised and lowered in the body water along vertically disposed guide cables 8, all as is well known in the art.

Internally of the wellhead body 1 is shown the usual removable seat protector sleeve 9, whereby a series of vertically spaced annular channels 10 in the wellhead body 1 are protected from exposure to well fluids during the performance of drilling operations through the casing C after the same has been set in the outer casing C1 and in the well bore section W1, as will be hereinafter described. These annular channels 10, as is known in the art, are adapted to receive latch elements of a number of casing hanger bodies (not shown) whereby, as will later be described, still additional inner strings of casing may be run into the casing C as the drilling progresses.

All of the wellhead H and base support structure 5 described is conventional, and the present invention is addressed to the problem of providing the plug launching apparatus A whereby the top plug TP is adapted to be employed as a barrier in a fluid stream passing downwardly through the casing C, so as to isolate a lower portion of the fluid stream constituted by a body of fluent cement material from an upper portion of the fluid stream constituted by a following fluid, the cement material being forced downwardly through the casing string C by the following fluid and being caused to flow, as shown by the arrows, through a passage 11 in the cementing shoe S into the well bore W1 and thence upwardly about the outside of the casing string C into the annular space B so as to fill or substantially fill the annular space B with cement material, any excess of cement material being displaced upwardly through the ports or passages 4 in the support ring 2.

More specifically, the plug launching apparatus A includes a tubular mandrel or conduit 12 having a central flow passage 13 therethrough. Fixed as at 12a upon the mandrel 12 is an adapter plate 14 having an outside diameter determined by the size of the wellhead body 1, the adapter plate 14 having a marginal seat 15 adapted for complemental seating engagement with the upper end of the body 1.

Latch means generally denoted at 16 are provided for releasably latching the adapter plate 14 to the wellhead body 1. This latch means 16 comprises an inner annular body 17 adapted to be disposed about the upper end of the wellhead body 1. A lower seal 18 is provided between the wellhead body 1 and the inside of the latch body 17. At its lower end the latch body 17 has a reduced diameter section 19, and at its upper end the latch body 17 has a reduced diameter section 20. These latch body sections 19 and 20 are respectively provided with cylindrical outer walls 21 and 22, about which are disposed end flanges 23 and 24 of an annular latch piston 25. Axially spaced seals 26,26 are provided between the annular latch piston 25 and the latch body 17 at the end flange 23 of the latch piston 25 and in axially spaced relation thereto so as to provide a piston chamber 27 therebetween. Axially spaced seals 28,28 are provided between the latch piston 25 and the latch body 17 at the end flange 24 of the latch piston 25 and in axially spaced relation thereto so as to provide a piston chamber 29 therebetween. The latch piston 25 has axially spaced lateral ports 30 and 31 respectively leading into the piston chambers 27 and 29 for the purpose of admitting and exhausting fluid under pressure in conduits respectively designated 32 and 33 which lead to the platform at the top of the body of water so as to allow the controlled axial shifting of the latch piston 25.

The latch body 17 has a plurality of laterally extended latch elements 34 shiftably disposed in openings 35 and having inner latch lugs 36 and outer latch lugs 37. When the latch piston 25 is in a lower position, as shown in FIG. 1, the inner wall of the piston 25 engages the latch lugs 37 to hold the latch elements 34 in a laterally inwardly shifted position, with the latch lugs 36 disposed in an annular latch groove or channel 38 provided externally adjacent the upper end of the wellhead body 1. Accordingly, the latch elements 34 connect the adapter plate 14 and the manifold 12 to the wellhead body 1, but, upon the application of fluid under pressure to the piston chamber 29 to shift the latch piston 25 upwardly, the latch lugs 37 will be brought into registry with an internal channel 39 provided in the latch piston 25 so that the latch elements 34 can move laterally outwardly from the channel 38 in the wellhead body 1, whereby to release the adapter plate 14 from the body 1.

At its upper end the mandrel 12 is suitably connected, as by a threaded joint 40, to a length of conduit, such as drill pipe 41. In this drill pipe 41 is the usual bumper sub 42, which, as is well known in the art, is a telescopically extensible assembly adapted to enable telescoping of the bumper sub to compensate for the rise and fall of the drilling platform at the top of the body of water when such platform is afloat on the water.

Above the bumper sub 42 the length of drill pipe 41 is connected, by a suitable threaded joint 43, to the lower end of a valve assembly generally denoted at V. In the illustrated embodiment the threaded joint 43 is between the drill pipe 41 and a crossover sub 44 which also has a threaded joint 45 with a nipple 46 at the discharge side of a valve assembly V. This valve assembly V includes a main body section 47 threadedly connected as at 48 to the nipple 46 and threadedly connected as at 49 to an upwardly extending nipple 50. The valve assembly V is conventional and includes the usual rotary valve plug 51 having a passage 52 therethrough of a diameter substantially the same as the diameter of the passage 53 provided in the valve body 47, this passage 53 communicating with the nipples 46 and 50. The plug 51 is suitably sealed as at 54 and is retained in the body 47 by a plug retainer 55. The valve plug 51 includes an actuator stem 56 projecting through the retainer 55 and having a suitable handle 57 thereon to allow rotary actuation of the valve plug 51 so as to selectively open or close the passage 53 through the body 47.

At the upper end of the nipple 50 is a cross-connector 58 having inlets 59 adapted to be connected to conduits leading from the usual pumps for supplying fluid through the cross-fitting 58 and through the valve assembly V to the tubular assemblage comprising the length of drill pipe 41 and the plug launching mandrel 12. The cross-fitting 58 at its upper end includes a closure plug or cap 60 threaded therein, as at 61, so as to be removed from the cross-connector 58.

The cross-connector 58 and the valve assembly V are located on the platform at the top of the water and, therefore, the length of the drill pipe 41 will be determined by the depth of the water in which the well is being drilled; and, as will hereinafter be more fully described, the cross-connector, and more particularly the removable cap 60 thereof, and the valve assembly V enable the release of plugs from the plug launching apparatus A and the subsequent shutting in of the well.

Figure 3:
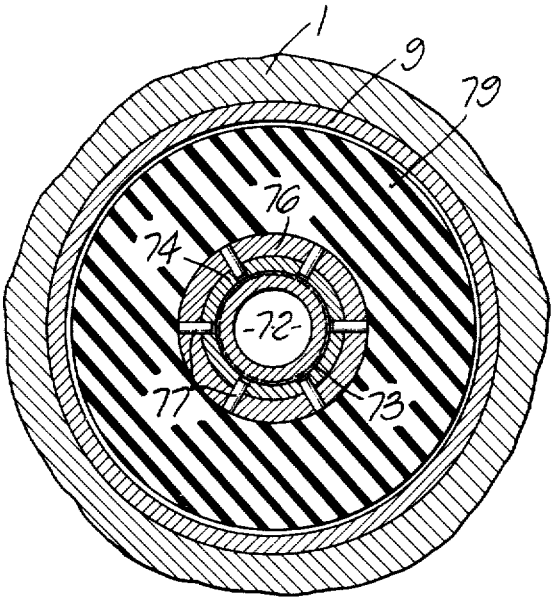
FIG. 3 is a view in horizontal section, as taken on the line 3—3 of FIG. 2b.
Figure 2B:
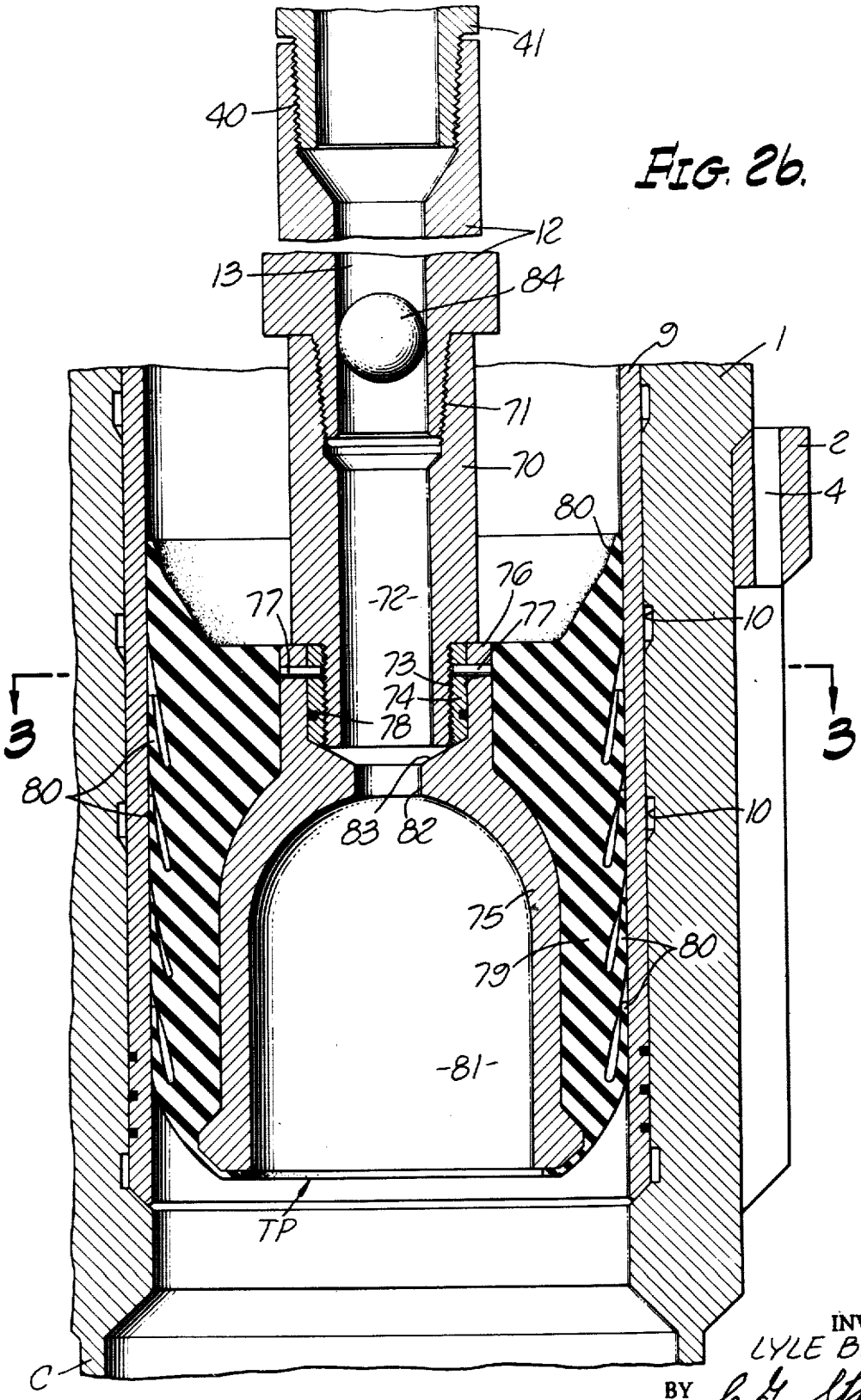
FIG. 2b is a view in vertical section and on the same scale as FIG. 2a illustrating the plug and mandrel in the wellhead body shown in the lower portion of FIG. 1.
Figure 4:
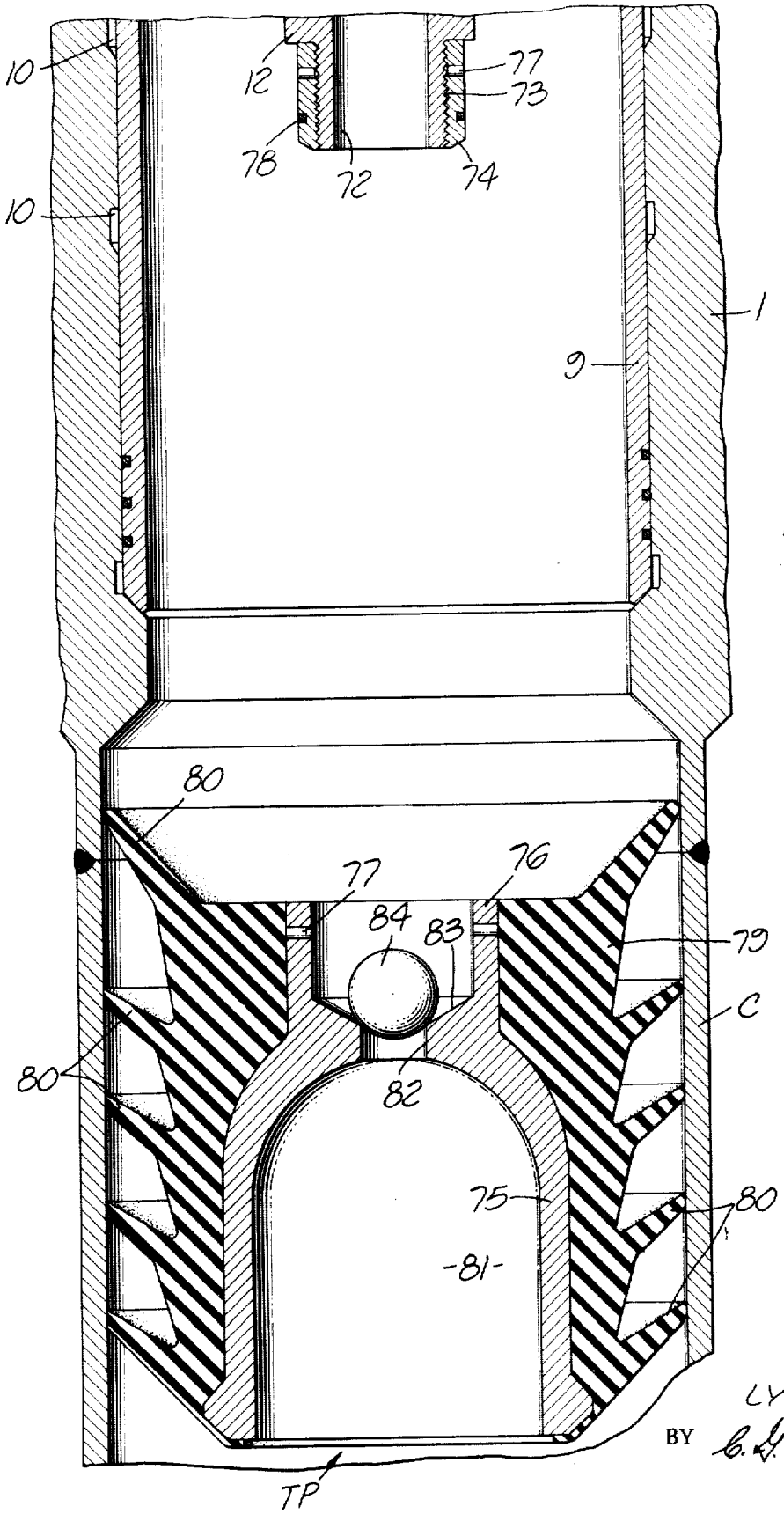
FIG. 4 is a fragmentary view in vertical section illustrating the top plug of FIGS. 1 and 2b released from its support for movement with the fluid stream into the well casing.

The top plug TP previously referred to is adapted to be connected to the lower end of the plug launching apparatus A by means of an adapter sleeve 70 having a threaded joint 71 with the mandrel 12. This adapter sleeve 70 has a passage 72 therethrough constituting a continuation of the passage 13 in the mandrel 12. At its lower end the adapter sleeve 70 is provided with a threaded section 73 adapted to receive a bushing 74. The top plug TP includes an inner body 75 having an upwardly extended cylindrical portion 76 disposed about the bushing 74 and secured thereto by a suitable number of circumferentially spaced shear pins 77, as best seen in FIG. 3, a suitable seal 78 being provided between the bushing 74 and the cylindrical portion 76 of the plug body 75. Molded on the plug body 75 is an elastomeric body section 79 having a number of outwardly and upwardly extended sealing lips 80 slidably engageable in the seat protector 9 within the casing hanger body 1. Interiorly, the plug body 75 provides a passage 81 circumscribed by a reduced diameter section 82 defining an upwardly facing seat 83. This seat 83 is engageable by a suitable device admitted into the fluid stream through the above-described cross-connector 58 during a well cementing operation, such a device being illustrated herein as a ball 84, whereby the passage 81 will be closed to prevent further flow of fluid through the plug passage 81. Closure of the plug passage 81 results in the production of a force acting downwardly on the plug TP to shear the shear pins 77, whereby to release the plug TP from the adapter 70. When the plug TP moves downwardly from the seat protector 9 into the casing C the sealing lips 80 of the elastomeric body section 79 will flex downwardly and outwardly into sliding, sealing engagement with the inner wall of the casing C, effectively providing a barrier between the fluid above the plug TP and the fluid therebelow.

In a typical cementing operation involving the use of the top plug TP and the launching apparatus A described above, the casing C will first be run into the wall supported by the casing wellhead body 1 which will be supported on a conventional running tool (not shown), the wellhead body 1 landing upon the support ring 2. Thereafter, the plug launching apparatus A, with the top plug TP connected to the lower end of the mandrel 12, will be lowered through the body of water on the length of drill pipe 41 until the adapter flange 14 lands upon the upper end of the wellhead body 1, and the plug TP is disposed within the seat protector 9. At this time, fluid under pressure supplied via the conduit 32 will be employed to shift the latch piston 25 downwardly to force the latch elements 34 laterally inwardly into the channel 38, whereby to effectively latch the plug launching apparatus A in place on the wellhead body 1. The surface equipment on the drilling platform will then made up, with the drill pipe 41 at the threaded joint 43 so as to connect the valve V and the cross-connector 58 in the composite tubular assembly which provides a flow path through the valve V and through the drill pipe 41 into the passage 13 of the mandrel 12 of the launching apparatus A. Thereupon, fluid lines may be connected to the inlets 59 of the cross-connector 58 and circulating fluid may be pumped downwardly through the tubular assembly, passing through the fluid passageway 81 in the plug TP and thence downwardly through the casing C, through the passage 11 in the cementing shoe S, into the well bore W1. Such fluid will flow upwardly in the well bore W1 and into the annulus B, passing from the latter through the ports 4 in the support ring 2. After circulation has been established, a fluent cement slurry is displaced through the cross-connector 48 into the tubular assemblage in a volume calculated to fill the well bore W1 and the annulus B to the desired height. At this time the pumping of fluid may be arrested to allow removal of the cap 60 from the cross-connector 58 and the insertion into the open cross-connector 58 of the ball 84. If desired or necessary during the insertion of the ball 84 into the cross-connector 58, the valve plug 51 may be rotated by the actuator handle 57 to close off the passage 53 through the valve V. Following insertion of the ball 84 the cap 60 will be replaced in the cross-connector 58, and the valve means V will be reopened, if it has been closed. Resumption of displacement of the cement downwardly through the tubular assemblage will result, as previously indicated, in the landing of the ball 84 on the seat 83 of the top plug TP and the release of the plug TP from the launching apparatus A. The plug TP will move downwardly in the column of fluid separating the cement from the following fluid until the plug lands upon the cement shoe S or other appropriate stop within the casing C.

When it is desired to recover the plug launching apparatus A it is merely necessary to supply fluid under pressure to the conduit 33 of the latch means 16 whereby to shift the latch piston 25 upwardly until the latch elements 34 are free to move laterally outwardly into the channel 39. Thereafter, the launching apparatus A may be removed from the wellhead body 1 and hoisted to the platform. A suitable recovery tool (not shown) may then be employed to pull the seat protector 9 from the wellhead body 1, as is customary so as to expose the channels 10 within the body 1 for reception of latch means of a casing hanger body supporting an inner string of casing when it is desired to run such additional string of casing following continued drilling of the well bore.

For example, the underwater completion of a well as illustrated in FIG. 1 employing the top plug TP may involve the cementing in place of a casing string C1 having a diameter of say 30 inches. The casing string C depending from the wellhead body 1 may have a diameter of 20 inches. Various additional strings of casing may be supported in the wellhead body 1 in the usual manner and, in the illustrative embodiment of FIGS. 5 through 9, an innermost string of casing designated C2 is shown as being supported within the wellhead body 1 so as to extend downwardly into a well bore W2 by a casing hanger body 100 which is joined as at 101 with the casing string C2. This casing hanger body 100 has an outwardly flared midsection 102 so that, adjacent its upper end, it has an outside diameter approaching that of the inside diameter of the wellhead body 1. The flared midsection 102 of the hanger body 100 seats upon the upper end 103 of a casing hanger body 104, part of which has been broken away. This casing hanger body 104, for example, may support within the casing string C a casing string of 9⅝ inches diameter; and below the casing hanger body 104 a similar body (not shown) may be employed to support within the casing string C a further casing string of 13⅜ inches diameter, all as is well known in the underwater completion of wells wherein all of the drilling and completion wellhead equipment is located on the floor F of the body of water.

Figure 5:
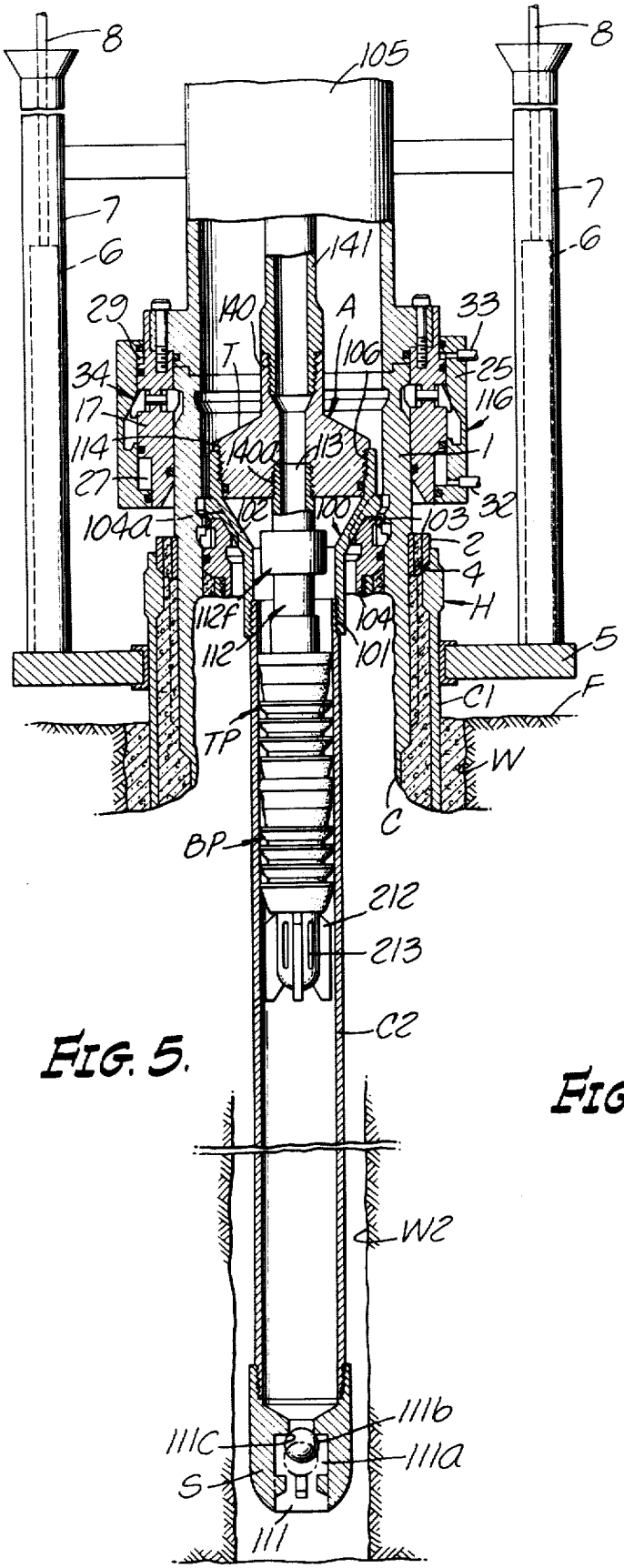
FIG. 5 is a view illustrating a modified cement plug launching apparatus installed in an underwater casing hanger.

In the present embodiment the latch means 116, corresponding to that previously described, is employed to secure in place on top of the wellhead body 1 a conventional blow out preventer stack 105, a portion of which is illustrated in FIG. 5. The plug launching apparatus A of the invention is illustrated as extending downwardly through the blow out preventer 105 and being secured to a lower end of a length of drill pipe 141 as by a threaded joint 140 with a universal running tool T which is, in turn, threadedly connected as at 106 within the upper end of the casing hanger body 100. Thus, the casing hanger body 100 and the casing string C2 are adapted to be run into the well on the running tool T, this tool having a flangelike body 114 which effectively corresponds to the flange 14 in the plug launching apparatus previously described. All of these components in this embodiment are standard components, and the plug launching mandrel 112 is adapted to be suitably connected as by a threaded joint 140a to the running tool T.

At its lower end the plug launching mandrel 112 in the present embodiment includes the top plug TP releasably connected to the mandrel 112, as in the previously described embodiment, and, in addition thereto, a bottom plug BP releasably connected to the top plug TP.

Thus, a tubular assemblage for the conduct of fluid downwardly into the casing string C2 is provided, whereby, as will be hereinafter described, a circulating fluid may be displaced downwardly through the drill pipe 141 and through the fluid passage 113 of the plug launching mandrel 112, through the respective plugs TP and BP, and through the shoe S at the lower end of the casing string C2, the fluid then flowing upwardly through the usual passages 104a provided in the casing hanger body 100 and thence upwardly outside of the drill pipe 141.

Inasmuch as the string of casing C2 may be of substantial length, say a number of thousands of feet, and may therefore be heavy, it is the practice to sometimes employ a cementing shoe S, as shown in FIG. 5, having float valve means including a valve chamber 111a having therein a ball check valve 111b adapted to seat on a downwardly facing ball seat 111c to prevent the entry of fluid in the well bore W2 into the casing string C2 as the casing is being lowered into the well bore. But, during the circulation of fluid as just described above, the ball check valve 111b will move downwardly from the seat 111c to permit the flow of such fluid downwardly through the passage 111 in the lower end of the float shoe S.

Figure 6:
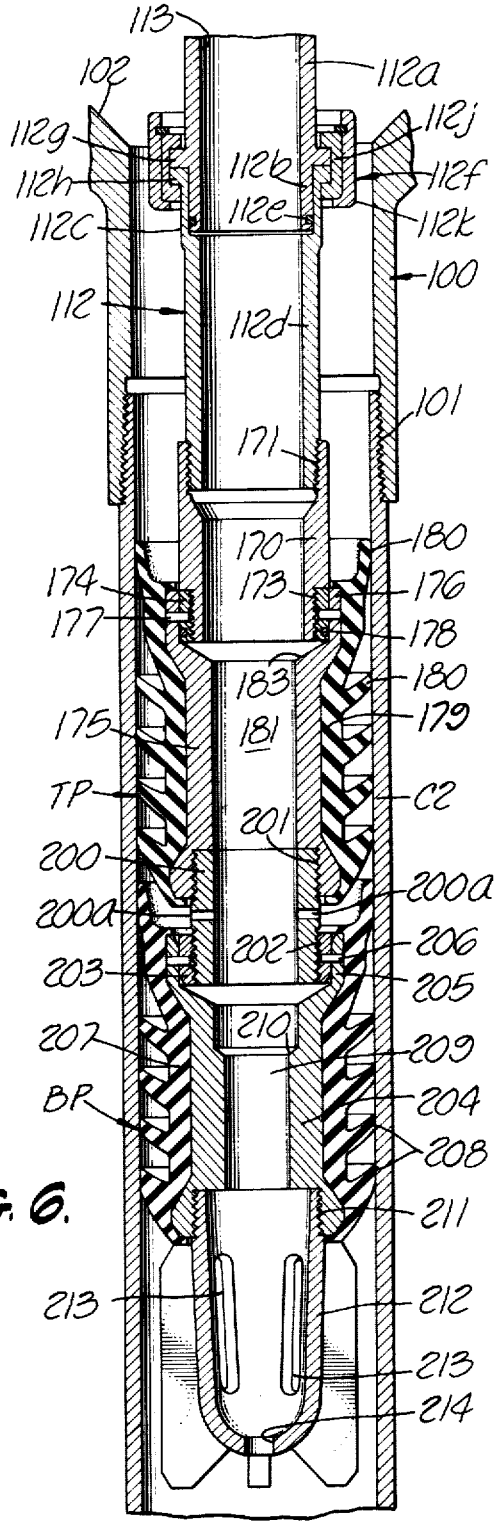
FIG. 6 is a view in vertical section on an enlarged scale illustrating the connection of the top and bottom plugs of FIG. 5 to the tubular support.

The details of the plug launching mandrel 112 and the connection of the top plug TP thereto, as well as the connection of the bottom plug BP to the top plug TP, is best seen in FIG. 6.

In this view it will be seen that the mandrel 112 includes an upper tubular body section 112a having a lower cylindrical end 112b sealed within an upwardly extended end 112c of a lower mandrel body section 112d. Suitable seal means 112e may be provided between the body ends 112b and 112c. Swivel means 112f are provided for interconnecting the body sections 112a and 112d, such swivel means including outturned flanges 112g and 112h respectively on the body sections 112a and 112d, these flanges being held together by a split, channeled ring 112j which is retained in place by a collar 112k.

At its lower end the mandrel 112 includes an adapter 170 suitably connected as by a threaded joint 171 to the mandrel section 112d. This adapter 170 is a tubular body which may be of a desired outside diameter whereby to support a top plug TP of the size necessary for use in the casing string in which the plug launching apparatus A is to be employed. In this connection, the lower end of the adapter 170 is externally threaded as at 173 for connection thereto of an internally threaded bushing 174. In this embodiment, as in the previously described embodiment, the top plug TP includes an inner body 175 having a cylindrical upper end section 176 adapted to fit about the bushing 174 so as to be releasably secured thereto by a suitable number of angularly spaced shear pins 177. In addition, a suitable seal ring 178 may be provided between the bushing 174 and the plug body extension 176. Molded on the inner plug body 175 is an outer elastomeric body 179 having a plurality of outwardly and upwardly extended resilient lips 180 adapted to slidably and sealingly engage within the upper end of the casing string C2 below the hanger body 100.

The connection between the top plug TP and the bottom plug BP comprises an intermediate connector sleeve 200 threadedly engaged within the lower end of the top plug inner body 175 as at 201. At its lower end the connector sleeve 200 is threaded as at 202 for reception of an internally threaded bushing 203 which may be of a suitable external diameter to support a bottom plug BP of a desired size in relation to the size of the casing string C2. As in the case of the top plug TP, the bottom plug BP has an inner body 204 provided at its upper end with a cylindrical upper extension 205 adapted to fit about the bushing 203 and to be retained thereon by means of a suitable number of circumferentially spaced shear pins 206. Molded on the inner plug body 204 is an elastomeric body 207 having upwardly and outwardly extended lips 208 which, like the lips 180 of the top plug TP, are adapted for sliding and sealing engagement within the casing string C2.

The top plug TP has a passage 181 therethrough circumscribed by a seat 183; and the bottom plug BP has a passage 209 therethrough circumscribed by a seat 210.

The seat 210 of the bottom plug BP is adapted to be engaged, as will hereinafter be described, by a suitable closure device for blocking off the passage 209 therethrough, whereby to cause the application of fluid pressure to the bottom plug BP to shear the pins 206, thereby releasing the bottom plug BP from the connector sleeve 200. In this connection, in order to apply fluid pressure to the entire cross-sectional area of the bottom plug BP the connector sleeve 200 is provided with one or more lateral ports 200a whereby fluid may pass from within the connector sleeve 200 exteriorly thereof so as to expose the uppermost lip 208 of the bottom plug BP to the effect of fluid pressure tending to separate the bottom plug BP from the top plug TP. The seat 183 of the top plug TP, like the seat 83 of the top plug of the first described embodiment, is adapted to be engaged by a suitable closure device whereby to apply fluid pressure to the top plug TP of the embodiment now being described to cause its release from the adapter 170.

For a purpose which will be hereinafter more fully described, the bottom plug BP supports, by a threaded connection 211 at its lower end, a downwardly extended cage 212 having suitable number of lateral flow passages 213 therein, as well as an end passage 214, for allowing the circulation of fluid downwardly through the bottom plug BP when both the top plug TP and the bottom plug BP are open, as seen in FIG. 6, to allow the circulation of a flushing fluid downwardly through the casing string C2 and upwardly through the well bore W2 back to the wellhead H.

It will be understood that the equipment at the platform at the top of the water for allowing such fluid circulation will include the surface apparatus described in connection with the embodiment of FIGS. 1 through 4, namely, a shut off valve assembly V and a cross-connector 58.

Figure 7:
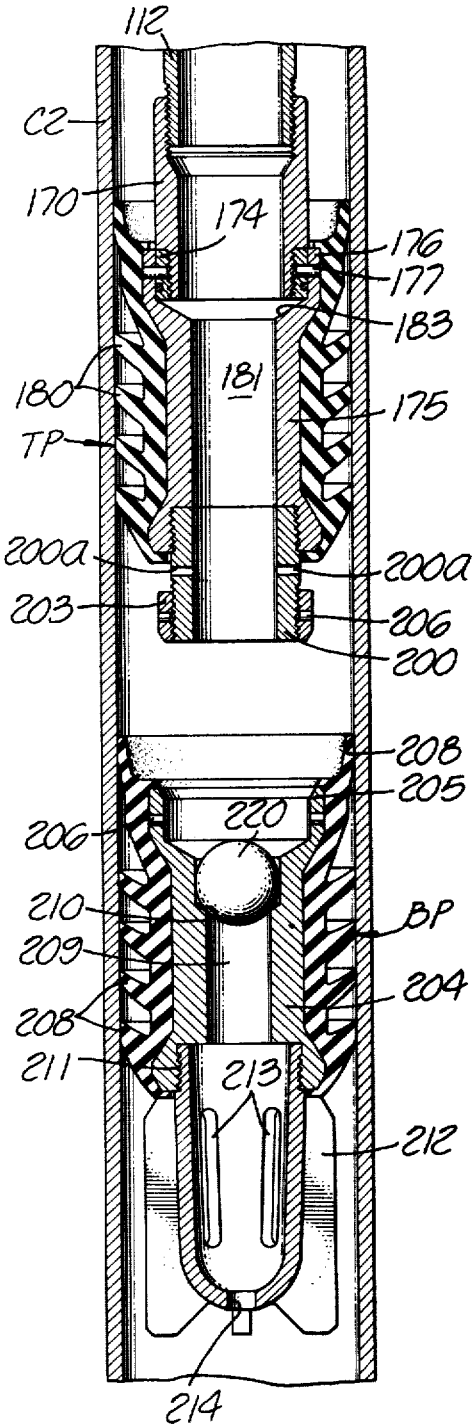
FIG. 7 is a fragmentary view in vertical section illustrating the release of the bottom plug from the top plug in the use of the apparatus of FIG. 5.
Figure 8:
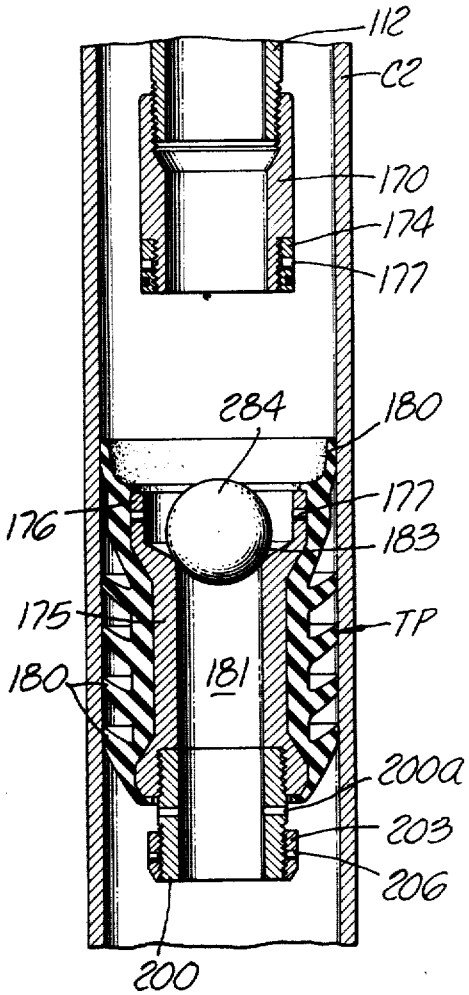
FIG. 8 is a view corresponding to FIG. 7, but showing the release of the top plug from the tubular support therefor in the use of the apparatus of FIG. 5.
Figure 9:
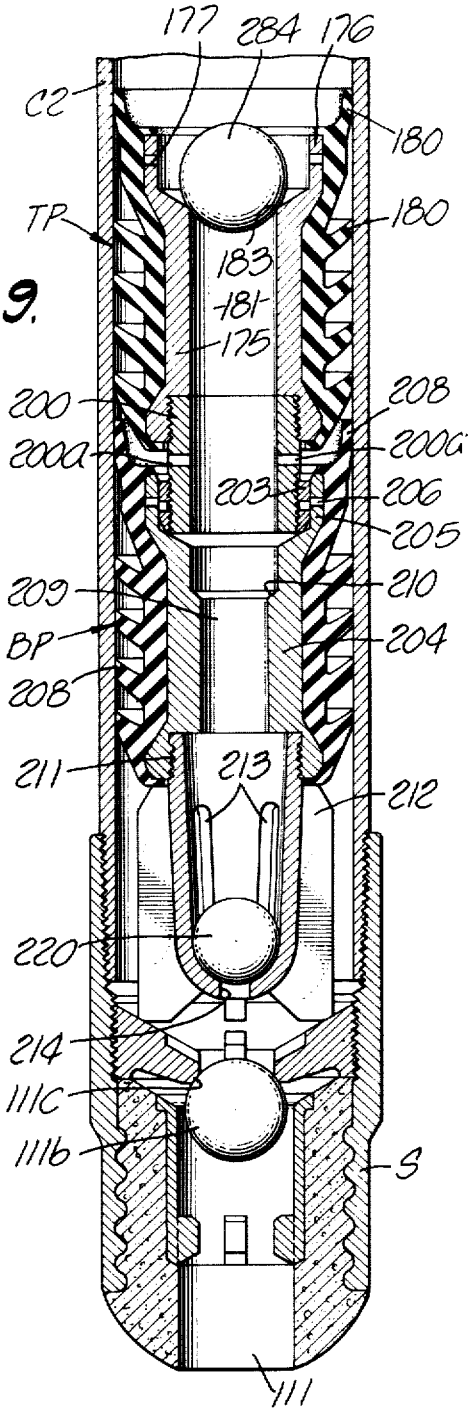
FIG. 9 is a fragmentary view in vertical section illustrating the landing of the bottom and top plugs on a casing float collar in the use of the apparatus of FIG. 5.

Referring to FIGS. 7 through 9, the plugs TP and BP are shown in their several positions during the performance of a cementing operation employing the plug launching apparatus of the present embodiment of the invention. As seen in FIG. 7, the closure device engageable with the seat 210 circumscribing the passage 209 through the bottom plug BP is shown as a ball 220 of a diameter greater than the passage 209. For a reason which will hereinafter be described, the ball 220 is composed of a suitable elastomeric material of sufficient hardness to resist deformation into the passage 209 under the influence of fluid pressure acting on the ball 220 so as to assure shearing of the shear pins 206 by which the bottom plug BP is effectively connected with the top plug TP.

Thus, following the circulation of a flushing fluid downwardly through the plugs TP and BP, through the casing string C2 and upwardly through the annulus to the wellhead, the ball 220 may be inserted into the fluid stream, as previously described, so as to travel downwardly therethrough into sealing engagement with the seat 210 of the bottom plug BP so that the plug BP provides a barrier between a quantity of fluent cement slurry thereabove and the flushing fluid therebelow. When the ball 220 seats on the seat 210, the bottom plug BP will break away from the top plug TP, as seen in FIG. 7, the sealing lips 208 sliding downwardly within the casing string C2, the bottom plug BP coming to rest on the cementing shoe S at the lower end of the casing string C2.

As seen in FIG. 8, a second ball 284 is adapted to be placed in the fluid stream in the manner previously described so as to travel downwardly with the cement slurry and seat upon the seat 183 in the top plug TP to close off the passage 181 therethrough, whereby the top plug TP will be released from the adapter 170 as has been previously described so as to effectively form a barrier between the cement slurry and the following fluid employed to force the top plug TP and the cement slurry downwardly through the casing string C2.

When the bottom plug BP lands upon the cementing shoe S it is necessary that the ball 220 be displaced through its seat 210 in the bottom plug BP and, accordingly, the ball 220 is composed of resilient elastomeric material so as to enable the deformation of the ball whereby it may pass downwardly through the plug passage 209 into the catcher 212, previously described, the passages 213 in the catcher 212 thereafter allowing the flow of cement outwardly therethrough for passage downwardly through the cement shoe S and thence upwardly outside the casing string C2 in the well bore W2. Such displacement of the cement slurry will continue until the top plug TP, as seen in FIG. 9, lands on the bottom plug BP, thereby arresting further downward movement of the top plug TP. Landing of the top plug TP on the bottom plug BP will be indicated at the platform on top of the water by an increase in the pump pressure, causing the displacement of the cement by the following fluid. At this time the cementing pumps may be shut down and the ball valve 111b may seat upon the seat 111c of the float shoe S, whereby to prevent backflow of the cement through the landed top and bottom plugs.

When it is desired to recover the plug launching mandrel 112 it is only necessary to remove the running tool 1 from the upper end of the hanger body 100 by rotating the drill pipe 141 in a direction to break the threaded joint 106.

It is notable that the plug launching apparatus, and more particularly the mandrel 112, forms no part of the wellhead structure or the structure required to withstand the circulating fluid or cementing pressures during the conduct of the cement operation. Instead, only the usual components employed for running the casing hanger body 100 and the casing string C2 thereon, as well as the casing hanger body 100, are subjected to the pressures of the circulating fluid and the cement during the cementing operation. Therefore, the mandrel 112 may be of a simple and inexpensive construction, as compared with the usual cementing heads employed to releasably support cementing plugs in such well cementing operations.

The invention hereof is not limited to use in the completion of wells beneath a body of water, as in the previously described embodiments. Indeed, the invention has application to the cementing of well casing strings in wells wherein the casing string extends upwardly through the drilling platform, as is customary in the drilling of some wells from stable offshore platforms and as is customary in the drilling of wells on land.

Figure 10:
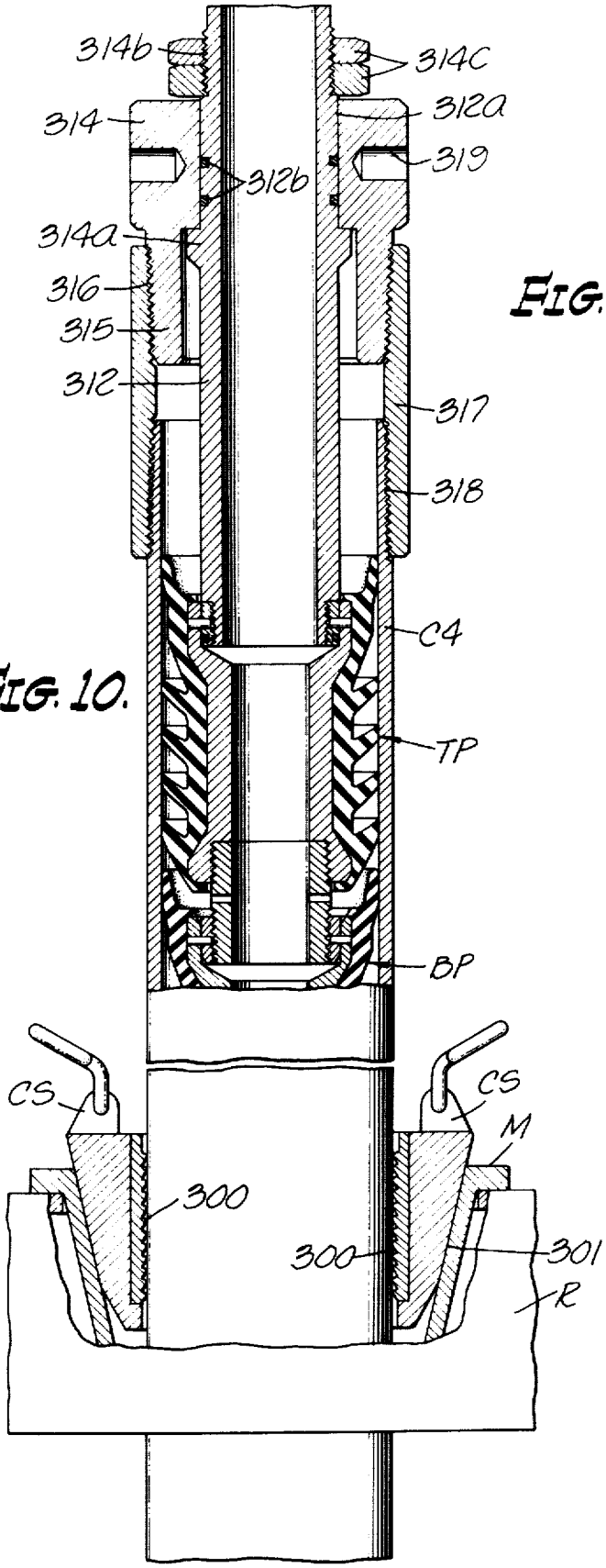
FIG. 10 is a fragmentary view partly in vertical section and partly in elevation showing a further modified plug launching apparatus made in accordance with the invention.

Accordingly, as seen in FIG. 10, a further modification of the invention is adapted for use in the cementing of a string of casing C4 which extends downwardly into a well bore (not shown) through the usual rotary table R of a drilling rig having a master bushing M adapted to receive the usual casing supporting slips CS having teeth 300 adapted to be forced into gripping engagement with the outer wall of the casing string C4 by the wedge action provided between opposing faces at 301 provided by the slips CS and the master bushing M, all as is customary. In the usual cementing of the casing string C4 a cementing head containing one or more cementing plugs would be connected to the upper end of the casing string C4, the cementing job completed, and, in most instances, the cementing head left in place until the cement has at least partially cured. Such conventional cementing operations involve, obviously, the need for a number of expensive casing heads.

In accordance with the present invention, however, a tubular plug launching mandrel 312 is provided having intermediate its ends a cylindrical surface 312a adapted to receive an adapter flange 314, suitable seals 312b being provided between the flange 314 and the surface 312a. In order to fix the flange 314 on the mandrel 312, the mandrel 312 is provided with an outstanding stop shoulder 314a below the cylindrical surface 312a, and above the cylindrical surface 312a the mandrel 312 is threaded as at 314b to support suitable retainer nuts 314c engageable with the adapter flange 314 to prevent its upward movement on the mandrel 312. Depending from the adapter flange 314 is a cylindrical section 315 which is externally threaded at 316 so as to engage in the complemental threads of the usual casing coupling 317, which is threaded at 318 on the upper end of the casing string C4. The coupling 317 is the coupling means whereby lengths of casing which are ordinarily joined together, or, if desired, may be a special coupling adapted at 318 to be threadedly engaged with the upper end of the casing string C4. In either event, the flange 314 provides means for connecting the same to the upper end of the casing string C4 responsive to rotation of the flange 314 about the cylindrical surface 312a. In order to facilitate the rotation of the flange 314 it is shown as being provided with one or more radial openings 319 for reception of a lever. At its lower end the mandrel 312 is illustrated as releasably supporting a top plug TP, and a bottom plug BP is releasably connected to the top plug in the same manner as the top and bottom plugs of the previously described embodiment, so that these plugs need no further description at this point. At the upper end of the mandrel 312 it may be suitably connected to the valve means V, as previously described, so that the release or launching of the top plug TP and the bottom plug BP may be effected in the same manner as has been previously described.

While the specific details of the invention have been herein shown and described, changes and alterations may be resorted to without departing from the spirit of the invention.

I claim:

1. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, releasable means connecting said top plug to said mandrel, a bottom cementing plug, releasable means connecting said bottom plug *directly* to said top plug, [said plugs each having] *means defining* a passage [therethrough] *through each plug* for the flow of cement from said mandrel passage into said well pipe, said bottom plug having means cooperative with a closure member in the cement flowing through said passage in the bottom plug to close the latter passage and effect release of said releasable means connecting said bottom plug to said top plug, and said top plug having means cooperative with a closure member in the cement flowing through said passage in the top plug to close the latter passage and effect release of said releasable means connecting said top plug to said mandrel.

[2. Cementing plug apparatus as defined in claim 1, wherein each of said plugs has an inner rigid plug body and an elastomeric outer body slidably engageable in said well pipe, said inner body of each of said plugs having said passage therethrough, said means releasably connecting said top plug to said mandrel including elements releasably connecting the inner body of said top plug to said mandrel, and said means releasably connecting said bottom plug to said top plug including a connector sleeve carried by the inner body of one of said plugs and elements releasably connecting said connector sleeve to the inner body of the other of said plugs.]

[3. Cementing plug apparatus as defined in claim 2, wherein said elements are shearable pins adapted to be sheared upon closure of the passage through said inner plug bodies in response to differential pressure acting across said plugs.]

[4. Cementing plug apparatus as defined in claim 2, wherein said elements are shearable pins adapted to be sheared upon closure of the passage through said inner plug bodies in response to differential pressure acting across said plugs, and including radial port means communicating from at least one of said passages to said well pipe to enable the application of pressure to said outer elastomeric body of at least one of said plugs to assist in the shearing of said pins.]

[5. Cementing plug apparatus as defined in claim 1, wherein each of said plugs has an inner rigid plug body and an elastomeric outer body slidably engageable in said well pipe, said inner body of each of said plugs having said passage therethrough, said means releasably connecting said top plug to said mandrel including shearable means releasably connecting the inner body of said top plug to said mandrel, and said means releasably connecting said bottom plug to said top plug including a connector sleeve carried by the inner body of one of said plugs and shearable means releasably connecting said connector sleeve to the inner body of the other of said plugs, said connector sleeve having radial port means communicating from said passage in said bottom plug into said well pipe to enable the application of pressure to said outer elastomeric body of said bottom plug to assist in the shearing of the last-mentioned shearable means.]

[6. Cementing plug apparatus as defined in claim 1, wherein said means in said bottom plug cooperative with a closure member comprises a seat circumscribing said passage through said bottom plug, and including catcher means below said seat, providing an opening for the further flow of cement through said bottom plug passage when said closure is displaced through said seat and engaged with said catcher means.]

[7. Cementing plug apparatus as defined in claim 1, wherein said adapter means includes a member having threads for connecting said adapter means to the well pipe, and including swivel means for allowing rotation of said member relative to said mandrel to connect said member to said well while said plugs remain stationary in said well pipe.]

*8. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, shearable means connecting said top plug to said mandrel, a bottom cementing plug, shearable means connecting said bottom plug directly to said top plug, means defining a passage through each plug for the flow of cement from said mandrel passage into said well pipe, said bottom plug having means cooperative with a closure member in the cement flowing through said passage in the bottom plug to close the latter passage and effect release of said shearable means connecting said bottom plug to said top plug, and said top plug having means cooperative with a closure member in the cement flowing through said passage in the top plug to close the latter passage and effect release of said shearable means connecting said top plug to said mandrel.*

*9. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, releasable means connecting said top plug to said mandrel, a bottom cementing plug, releasable means connecting said bottom plug directly to said top plug, means defining a passage through each plug for the flow of cement from said mandrel passage into said well pipe, said bottom plug having means cooperative with a closure member in the cement flowing through said passage in the bottom plug to close the latter passage and effect release of said releasable means connecting said bottom plug to said top plug, and said top plug having means cooperative with a closure member in the cement flowing through said passage in the top plug to close the latter passage and effect release of said releasable means connecting said top plug to said mandrel, wherein each of said plugs has an inner rigid plug body and an elastomeric outer body slidably engageable in said well pipe, said inner body of each of said plugs having said passage therethrough, said means releasably connecting said top plug to said mandrel including elements releasably connecting the inner body of said top plug to said mandrel, and said means releasably connecting said bottom plug to said top plug including a connector sleeve carried by the inner body of one of said plugs and elements releasably connecting said connector sleeve to the inner body of the other of said plugs.*

*10. Cementing plug apparatus as defined in claim 9, wherein said elements are shearable pins adapted to be sheared upon closure of the passage through said inner plug bodies in response to differential pressure acting across said plugs.*

*11. Cementing plug apparatus as defined in claim 9, wherein said elements are shearable pins adapted to be sheared upon closure of the passage through said inner plug bodies in response to differential pressure acting across said plugs, and including radial port means communicating from at least one of said passages to said well pipe to enable the application of pressure to said outer elastomeric body of at least one of said plugs to assist in the shearing of said pins.*

*12. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, releasable means connecting said top plug to said mandrel, a bottom cementing plug, releasable means connecting said bottom plug directly to said top plug, means defining a passage through each plug for the flow of cement from said mandrel passage into said well pipe, said bottom plug having means cooperative with a closure member in the cement flowing through said passage in the bottom plug to close the latter passage and effect release of said releasable means connecting said bottom plug to said top plug, and said top plug having means cooperative with a closure member in the cement flowing through said passage in the top plug to close the latter passage and effect release fo said releasable means connecting said top plug to said mandrel, wherein each of said plugs has an inner rigid plug body and an elastomeric outer body slidably engageable in said well pipe, said inner body of each of said plugs having said passage therethrough, said means releasably connecting said top plug to said mandrel including shearable means releasably connecting the inner body of said top plug to said mandrel, and means releasably connecting said bottom plug to said top plug including a connector sleeve carried by the inner body of one of said plugs and shearable means releasably connecting said connector sleeve to the inner body of the other of said plugs, said connector sleeve having radial port means communicating from said passage in said bottom plug into said well pipe to enable the application of pressure to said outer elastomeric body of said bottom plug to assist in the shearing of the last-mentioned shearable means.*

*13. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, releasable means connecting said top plug to said mandrel, a bottom cementing plug, releasable means connecting said bottom plug directly to said top plug, means defining a passage through each plug for the flow of cement from said mandrel passage into said well pipe, said bottom plug having means cooperative with a closure member in the cement flowing through said passage in the bottom plug to close the latter passage and effect release of said releasable means connecting said bottom plug to said top plug, and said top plug having means cooperative with a closure member in the cement flowing through said passage in the top plug to close the latter passage and effect release of said releasable means connecting said top plug to said mandrel, wherein said means in said bottom plug cooperative with a closure member comprises a seat circumscribing said passage through said bottom plug, and including catcher means below said seat, providing an opening for the further flow of cement through said bottom plug passage when said closure*

*is displaced through said seat and engaged with said catcher means.*

*14. Cementing plug apparatus for use in cementing a well pipe in a well bore comprising: a mandrel, adapter means for connecting said mandrel to the well pipe with said mandrel extending longitudinally in said well pipe, said mandrel having a passage therethrough for the flow of cement into the well pipe, a top cementing plug, releasable means connecting said top plug to said mandrel, a bottom cementing plug, releasable means connecting said bottom plug directly to said top plug, means defining a passage through each plug for the flow of cement from said mandrel passage into said well pipe, said bottom plug having means cooperative with a closure member in the cement flowing through said passage in the bottom plug to close the latter passage and effect release of said releasable means connecting said bottom plug to said top plug, and said top plug having means cooperative with a closure member in the cement flowing through said passage in the top plug to close the latter passage and effect release of said releasable means connecting said top plug to said mandrel, wherein said adapter means includes a member having threads for connecting said adapter means to the well pipe, and including swivel means for allowing rotation of said member relative to said mandrel to connect said member to said well while said plugs remain stationary in said well pipe.*

* * * * *